United States Patent [19]

Kearney

[11] 4,446,354

[45] May 1, 1984

[54] OPTOELECTRONIC WELD EVALUATION SYSTEM

[75] Inventor: Frank W. Kearney, Champaign, Ill.

[73] Assignee: The United States of America as represented by the Secretary of the Army, Washington, D.C.

[21] Appl. No.: 268,224

[22] Filed: May 29, 1981

[51] Int. Cl.³ .............................................. B23K 9/10
[52] U.S. Cl. ............................ 219/130.01; 219/130.21
[58] Field of Search ..................... 219/130.01, 130.21, 219/137 PS, 124.34; 356/45, 43, 44

[56] References Cited

U.S. PATENT DOCUMENTS

| 3,271,558 | 9/1966 | Davis ............................. 219/130.21 |
| 3,526,748 | 9/1970 | Rienks ........................... 219/130.01 |
| 3,611,805 | 10/1971 | Hishikari ............................. 356/45 |
| 3,666,949 | 5/1972 | De Falco et al. .............. 219/130.21 |

FOREIGN PATENT DOCUMENTS

| 1912344 | 9/1971 | Fed. Rep. of Germany ...... 219/137 PS |
| 2045473 | 10/1980 | United Kingdom ........... 219/130.21 |
| 278923 | 11/1970 | U.S.S.R. .......................... 219/124.34 |

Primary Examiner—C. C. Shaw
Attorney, Agent, or Firm—Darrell E. Hollis

[57] ABSTRACT

The radiation emitted from a hot weld bead is received by a lens system and focused onto a first end of a fiber optic light pipe. The received radiation is separated into spectral bands by the use of optical filters, and is then transmitted to one or more photodetectors, each producing a corresponding output signal. The output of each photodetector is compared with a known reference value indicative of an ideal weld. A significant deviation of the output from the reference value indicates the presence of a weld flaw.

5 Claims, 4 Drawing Figures

OPTOELECTRONIC WELD EVALUATION SYSTEM

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

This invention relates generally to systems for monitoring welding operations, and more particularly to a non-contact optical sensor for separating and quantizing the radiation spectrum emitted from the weld puddle of a weld bead to analyze same.

2. Discussion of Related Art

The cost of locating and repairing defects in welded products can be a major portion of construction costs. Weld inspection alone can constitute 25%-40% of total weld fabrication costs. Thus, it would be desirable to have a real-time weld quality monitor which can provide an alarm signal or interrupt the welding process when defects in the weld bead are occuring, thus precluding costly rework.

Direct quantitative measurements of certain parameters of welds during the welding process have not been possible for several reasons. In particular: (a) high weld temperatures consume and destroy sensors proximate to the weld area; (b) contacting sensors introduce a discontinuity of the weld process causing data uncertainty; and (c) in the case of manual welding, the subjectiveness peculiar to the welder is indeterminate and variable.

Presently, some indirect measurements of weld beads are made through the use of thermocouples and the like, but these techniques exhibit time lags, averaging effects and other factors that mitigate the validity and reproducibility of the information obtained.

Attempts at providing systems for measuring various welding parameters have been made in the past. For instance, U.S. Pat. No. 3,236,997 to Johnson et al shows a system for controlling the length of a welding arc in a consumable electrode welding apparatus. A photosensitive transducer, such as a photodiode, is positioned to sense the illumination emitted by the arc between the consumable electrode and the workpiece. The sensing system includes a tubular pipe and a mirrored surface to project a long beam of detectable illumination from the arc through the pipe to the photodiode sensor.

U.S. Pat. No. 3,262,006 to Sciaky et al shows a welding control system having a light sensitive probe incorporating an arrangement using fiber optics to conduct the illumination from an area adjacent the weld to a sensor or phototransducer which is disposed at a remote location. An ultraviolet filter can be used in the system to in effect see through the flame portion of the arc to the inner plasma portion. This approach operates to maintain the electrode at a substantially constant distance from the the workpeice.

U.S. Pat. No. 3,370,151 to Normando shows a weld control system using radiant energy detector scanning. A photocell is employed which is sensitive to infra-red radiation.

Finally, U.S. Pat. No. 3,602,687 to Pollock shows an arc length control comprising two pick-up sensors which are spaced at preselected intervals along the arc path.

OBJECTS OF THE INVENTION

One object of the present invention is to provide a sensor for use in welding systems which is capable of measuring various welding parameters without physically contacting the weld bead being produced.

A further object of the present invention is to provide a weld sensor system which produces a real time output directly and instantaneously related to quantities relevant to a satisfactory weld.

Another object of the present invention is to provide a weld quality sensor which produces an output which can be used in conjunction with other measured quantities to control the welding process in an automatic welding system.

A further object of the present invention is to provide a weld quality sensor which can interface easily with in situ welding equipment without affecting the functioning of that equipment.

Another object of the present invention is to provide a weld quality sensor which is easily portable to facilitate its use on various welding installations as the need arises.

A further object of the present invention is to provide a weld quality sensor which is prduced from standardly available components and can withstand severe conditions of a welding environment without experiencing degradation in performance over a sustained period of time.

Finally, another object of the present invention is to provide a weld quality sensor which is amenable in large part to fabrication with large scale integrated circuit components, thus reducing fabrication cost and increasing system reliability.

SUMMARY OF THE INVENTION

The welding arc in terms of the present invention can be thought of as a gaseous conductor which changes electrical energy into heat. The welding arc can be defined as a particular group of electrical discharges that are formed and sustained by the development of a gaseous conductive media. The current carriers for the gaseous media are produced by thermal means and field emission. The arc current is carried by the plasma, the ionized state of a gas, which is composed of nearly equal numbers of electrons and ions. Mixed with the plasma are other states of matter, including molten metals, slags, vapors, neutral and excited gaseous atoms and molecules.

The present invention uses opto-electronic technology to detect the amplitude and wavelength of radiation emitted by the welding arc. A photodetector, or an array of photodetectors, serve as the primary sensor(s) with appropriate circuitry to provide the required output information.

Essentially, one or more fiber optic light pipes or bundles receive the radiant emission from a molten weld bead in the vicinity of the weld puddle at their first ends. Lenses are used to direct and concentrate the radiation onto the first ends of the fiber optic light pipes. Each of the fiber optic light pipes is used to transmit a different selected portion of the radiation spectrum. The spectral components are separated by the use of optical filters, such as those standardly used in photographic systems. The filtered spectral bands are chosen to correspond with sections of the spectra known to be indicative of specific weld flaws.

The second end of each fiber optic light pipe is disposed in operative relation to a photodetector, which transforms the received radiation into an electrical signal indicative of the amplitude of the radiation in the associated spectral band. The output of each photodetector is directly compared with a reference signal which constitutes an imperically derived value indicative of a high quality weld. If the difference between the measured value and the reference value exceeds a preselected limit, an alarm is sounded or a system shutdown mechanism is activated.

While a single sensor may be used for each spectral band of interest on a linear weld, a second embodiment of the invention is necessary for use with rectilinearly produced welds. The second embodiment of the invention comprises three fiber optic light pipes disposed in two orthogonal axes. Two of the pipes extend laterally on opposite sides of the longitudinal extent of the weld bead, while the third light pipe is aligned with the longitudinal extent of the weld bead. The outputs of the three light pipes are combined vectorially, and this is used to indicate a defective weld.

BRIEF DESCRIPTION OF THE DRAWINGS

Various additional objects, features and attendant advantages of the present invention will be more fully appreciated as the same becomes better understood from the following detailed description of the invention when considered in connection with the accompanying drawings in which like reference numerals represent like parts throughout and in which.

DESCRIPTION OF THE PREFERRED EMBODIMENTS

Figure 1:
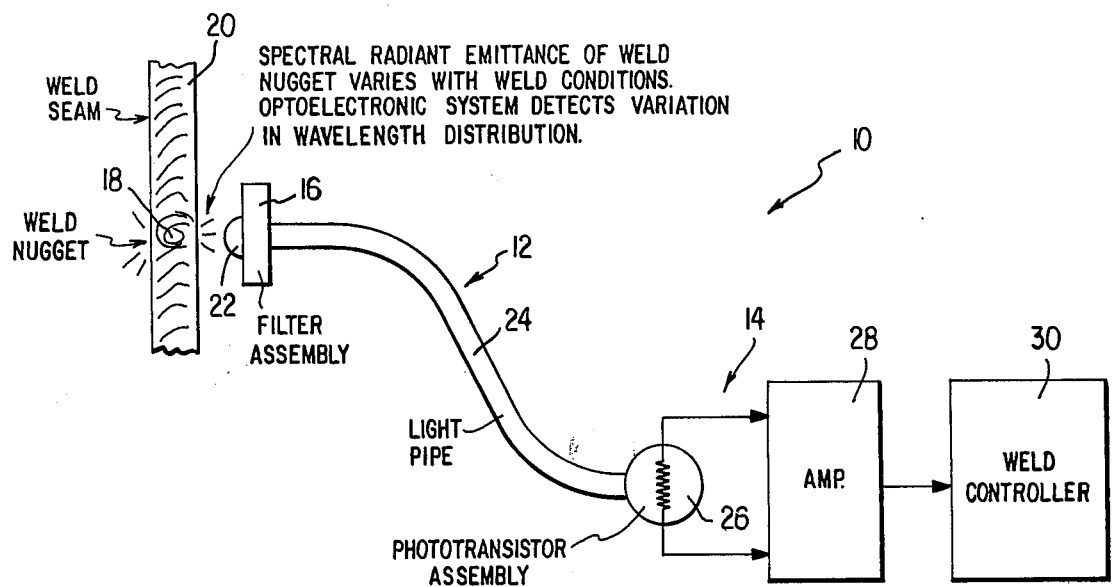
FIG. 1 represents in schematic form the weld sensor system of the present invention.

Now with reference to the drawings, the embodiments of the weld evaluation sensor system incorporating the principles and concepts of the present invention and generally referred to by the reference numeral 10 will be described in detail.

With specific reference to FIG. 1, it can be seen that the system of the present invention essentially comprises a radiation receiving apparatus designated generally by the reference numeral 12, and a radiation level evaluation section designated generally by the reference numeral 14. The radiation receiving apparatus 12 is disposed in close proximity to a weld nugget 18 of a weld bead 20, and transmits radiation received therefrom to the level evaluation section designated generally by reference numeral 14. The receiving apparatus 12 also separates the received radiation into spectral bands. The level evaluation section 14 quantizes the received radiation provided by apparatus 12 and generates a signal in accordance therewith.

The amount and character of spectral radiation emitted by welding arcs depend fundamentally upon the atomic mass and chemical structure of the gas, temperature and pressure of the arcs. Spectral analysis of arc radiation will show bands, lines and continua. The analysis of radiation from organic type covered electrodes shows molecular bands due to the existence of vibrational and rotational states as well as line and continuum emission from excited and ionized states. The inert gas arcs radiate predominantly by atomic excitation and ionization. As the energy input to welding arcs increases, higher states of ionization occur, resulting in emitted radiation from higher energy levels.

Figure 2:
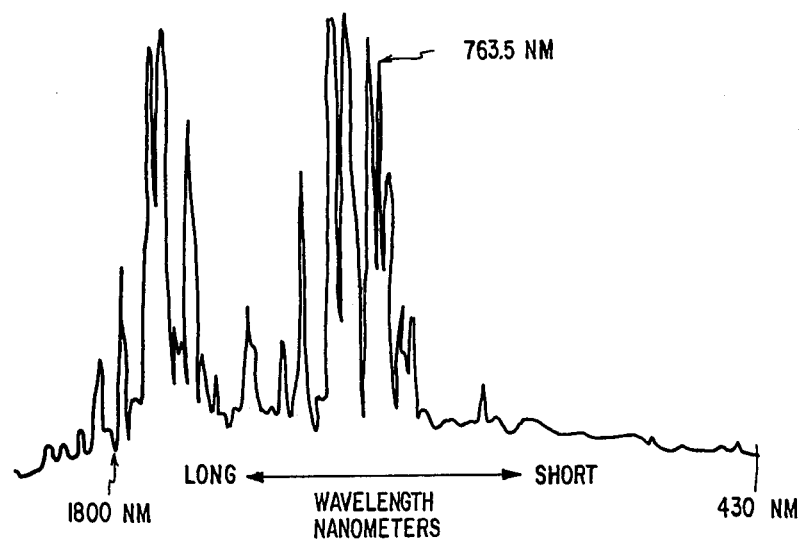
FIG. 2 is a graphical representation of a typical weld spectrum for an argon shielded tungsten arc in which the ordinate axis represents amplitude and the abscissa represents wavelength in nanometers.

Attention now is directed to FIG. 2, which shows a graphical representation of the spectrum emitted from one particular welding apparatus. FIG. 2 represents the visible spectrum and a portion of the infrared spectrum emitted from an electric arc generated under substantially ideal conditions by a 3 mm. diameter pure tungsten electrode carrying 200 amps of current and protected by an argon shield. This welding apparatus is of conventional design and thus is not depicted in the drawings. It is seen that the graph of FIG. 2 shows distinct radiation amplitudes at distinct wavelengths. By comparing the frequency spectrum emitted by a gas shielded tungsten arc welding system as it operates to the frequency spectrum of FIG. 2, the deviations between these two frequency spectrums can be used as an indication of weld defects forming in the weld bead being produced.

Figure 3:
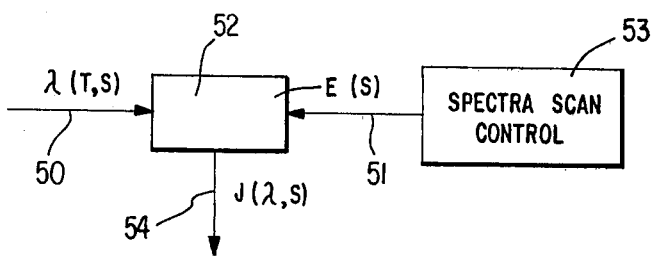
FIG. 3 is a block diagram showing spectral scanning process performed by the present invention.

In general, the weld evaluation spectrum measurement to be performed is absolute and can be obtained by signal processes which conform to the block diagram of FIG. 3. In FIG. 3, input line 50 carries signal (T,s) which represents the spectral radiant emittance of the observed weld bead region. This spectral radiant emittance is a function of the temperature of that region. A block 52 represents the filtering operation performed on signal (T,s) to control the frequency band thereof. A spectral scan control 53 controls the transfer function E(s) of block 52 via a line 51. The output of block 52 on a line 54 is the radiation intensity in the desired frequency band indicated by $J(\lambda,s)$. The mathematical equivalence in the frequency domain is expressed by the following equation (1):

$$J(\lambda,s) = [\lambda(T,s)][E(s)] \qquad (1)$$

The present invention utilizes one or more of the receiving apparatuses 12 tuned to different spectral frequency bands to separate segments of weld bead spectra correlatable to specific ideal weld bead parameters. The frequency spectrum of a particular arc can be broken into the frequency bands by the use of optical filters, such as the filter assembly 16 of FIG. 1. It is apparent that optical filters having different passbands would be used on the separate apparatuses 12. Commercial photographic filters having the desired optical frequency characteristics can be readily obtained and used in the system 10.

The filter assembly 16 receives the radiation from the weld nugget 18 of the weld bead 20. The received radiation is focused by a lens assembly 22 through the filter assembly 16 onto one end of a fiber optic bundle or light pipe 24, which transmits the radiation to the evaluation section 14. The fiber optic bundle or light pipe 24 can be, for example, 1/16–⅛ of an inch in diameter and exhibit a frequency passband in the frequency transmission range required. Specifically with respect to the frequency spectrum of FIG. 2, such a range would be 400 nanometers to 1,900 nanometers.

For continuous observation of each spectral band of interest, a plurality of fiber optic bundles or light pipes 24 and associated lens assemblies 22 would be used with different filters 16, as discussed above. However, it is also feasible to use one fiber optic bundle 24 and lens 22 combination and make provision for interchanging the filters 16. In either case, provision should be made to segment the arc spectra into approximately five spectral bands to provide adequate resolution to quantify weld flaws.

The specific frequency bands of interest must be determined empirically for the type of welding defect to be monitored. For instance, weld arc instability or "sputtering" is one of the most common flaw inducing conditions encountered. Laboratory testing using radiometers indicates that spectral lines omitted by an unstable arc are very dense in the visible range. To quantify this condition, for example, the filter assembly 16 used can be a ratton 57 cylinder of conventional design. Similar empirical data can be derived from other common weld flaws such a porosity, lack of penetration, lack of fusion, etc.

The filtered radiation from the optical fiber bundle 24 is received by evaluation section 14 comprising a phototransistor assembly 26, an amplifier 28 and a weld controller 30. Phototransistor assembly 26 can be any commercially available type, such as Type TIL-63. The received radiation from the second end of fiber optic light pipe 24 is converted by assembly 26 into an electrical signal, which is amplified by amplifier 28. The output received signal of amplifier 28 is provided to the weld controller 30, which compares the level of this received signal with a reference value corresponding to the empirically derived value indicative of optimum weld characteristics for the frequency band being monitored. If the deviation between the received signal level and the reference value exceeds a preselected limit, the weld controller sounds an alarm (not shown) or activates a welding system interrupt (also not shown) to stop the welding process.

In lieu of the use of filters 16, phototransistors 26 (or other suitable types of photosensors) can be chosen to have a spectral response(s) only in the spectral band(s) to be measured. For example, in practice, an array of photodiodes having different spectral responses has been satisfactorily substituted for assembly 26. The diode array is then scanned sequentially to produce the desired frequency spectra bands.

A further modification which may be employed in this regard is control of the bias to the phototransistor 26 to effect control of the received frequency spectrum. A continuous bias sweep of the phototransistor assembly 26 may serve to allow the use of only a single fiber optic bundle or light pipe 24.

Figure 4:
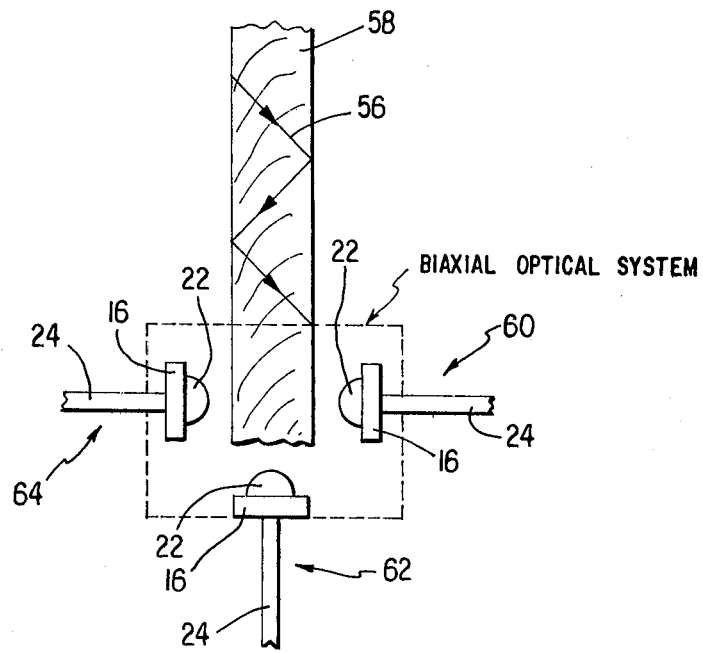
FIG. 4 shows in schematic form a second embodiment of the weld sensor system for use with rectilinear welds.

While equation (1) above is accurate for linear welds, for rectilinear welds a different configuration of the present invention is necessary. Referring now to FIG. 4, it can be seen that the path of the weld electrode is generally depicted by arrows 56, which follow a zigzag course to produce a rectilinear weld bead 58. In this instance, three receiving apparatuses 60, 62 and 64 are necessary.

Each of the apparatuses 60, 62 and 64 is equivalent to receiving apparatus 12 of FIG. 1, and comprises a fiber optic bundle or light pipe 24 having the emitted radiation focused on its first end by a lens assembly 22 and a filter assembly 16 disposed between the lens assembly 22 and the first end for passing only the frequency band of interest.

The output of unit 60 is:

$$j_{60}(T) \qquad (2)$$

The output for unit 62 is:

$$k_{62}(T) \qquad (3)$$

The output for unit 64 is:

$$j_{64}(T) \qquad (4)$$

For focus within 0.25 to 0.3 steradians, the following equation is valid:

$$|J(\lambda)| = |J(\lambda 62)| \qquad (5)$$
$$= |J(\lambda 60)|$$
$$= |J(\lambda 64)|,$$

and, thus, no additional computation is required.

However, if the focus is at a greater solid angle than 0.3 steradians, the outputs of 60, 62 and 64 become unequal and must be added vectorially as follows:

$$J(\lambda) = j[J(\lambda 60) - J(\lambda 64)] + k\lambda 62$$

Implementation of the above equation would be obvious to one of ordinary skill in the art.

The sensor system of the present invention also can be used to measure weld parameters, such as the cooling rate. For example, as a weld cools, the radiation emitted therefrom experiences a transition from long to short wavelengths. The rate of change can be measured by "following" the response rate of a PbS sensor used in place of phototransistor assembly 26. Alternatively, the peak output of a PbSe sensor to a CdSe unit can be monitored.

Also, the sensor system can be used to establish optimum relative proportions of different segments of the emitted spectrum for a particular weld. For example, by comparing the outputs of an array of ZnS and PbTe cells, appropriate ratios for the different frequency spectrums can be measured.

The foregoing is considered as illustrative only of the principles of the invention. Since numerous modifications and changes will be readily apparent to those skilled in the art, it is not desired to limit the invention to the exact construction and operation shown and described and, accordingly, all suitable modifications and equivalents may be resorted to, falling within the scope of the invention.

What is claimed is as follows:

1. A weld quality sensing system for monitoring a weld bead, comprising:
   (a) a first fiber optic light pipe, having first and second ends, disposed to receive radiation emitted from the weld bead at said first end;
   (b) first photodetector means disposed at said second end of said fiber optic light pipe for generating an electrical signal in accordance with the spectral band amplitudes of said radiation;
   (c) first means for driving said first photodetector means with a continuous bias sweep signal thereby controlling the received radiation; and (d) first means for comparing said electrical signal with a reference value.

2. The apparatus of claim 1 further comprising:
  (a) second and third optical light pipes, each having first and second ends, disposed to receive radiation emitted from the weld bead in othogonal axes with said first light pipe;
  (b) second and third photodetector means respectfully disposed at said second end of said second and third light pipes for generating electrical signals in accordance with the spectral band amplitude of said radiation;
  (c) second and third means for driving said second and third photodetector means with a continuous bias sweep signal thereby controlling the received radiation; and
  (d) second and third means for comparing said electrical signals with reference values.
  (e) means for comparing said electrical signals with reference values corresponding to the different spectral bands.

3. The apparatus of claim 1 further comprising first lens means for focusing radiation from said weld bead onto said first end of said first fiber optic light pipe.

4. The apparatus of claim 2 further comprising second and third lens means for respectfully focusing radiation from said weld bead onto said first end of said second and third optic light pipes.

5. A weld quality sensing system for monitoring a weld bead,
  (a) a first, second and third plurality of optical filters for receiving radiation from said weld bead and partitioning the radiation into spectral bands, said first, second and third plurality of optical filters being disposed to receive the radiation along orthogonal axes, each said plurality of optical filters exhibiting substantially identical spectral properties;
  (b) a first, second and third plurality of fiber optic light pipes connected to said first, second and third plurality of optical filters, respectively;
  (c) first, second and third lens means for focusing radiation from said weld beam onto said first, second and third plurality of optical filters, respectively; and
  (d) a first, second and third plurality of photodetectors, coupled respectively to said first, second and third plurality of light pipes, for detecting radiation in different spectral bands and generating electrical signals in accordance with the amplitude of said different spectral bands.

* * * * *